US012627131B2

(12) United States Patent
Hitchcock et al.

(10) Patent No.: US 12,627,131 B2
(45) Date of Patent: May 12, 2026

(54) CABLE INLET PASS-THROUGH STRAIN RELIEF GUIDE

(71) Applicant: TE Connectivity Solutions GmbH, Schaffhausen (CH)

(72) Inventors: Matthew Bryan Hitchcock, Middletown, PA (US); Nathan Philip Myer, Middletown, PA (US); Ram Kishore Venkatesan, Winston Salem, NC (US); Troy Agner, Winston Salem, NC (US); Subodh Patil, Winston Salem, NC (US); Barakissa Gakou, Winston Salem, NC (US); Andrew Jacob Vasbinder, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 189 days.

(21) Appl. No.: 17/870,464

(22) Filed: Jul. 21, 2022

(65) Prior Publication Data

US 2024/0030694 A1     Jan. 25, 2024

(51) Int. Cl.
| | |
|---|---|
| *H02G 15/013* | (2006.01) |
| *B60L 53/16* | (2019.01) |
| *H01B 17/30* | (2006.01) |
| *H02G 15/007* | (2006.01) |

(52) U.S. Cl.
CPC ............ *H02G 15/013* (2013.01); *B60L 53/16* (2019.02); *H01B 17/30* (2013.01); *H02G 15/007* (2013.01)

(58) Field of Classification Search
CPC .... H01B 17/30; H01R 13/5208; H02G 3/083; H02G 15/013; H02G 15/007; B60R 16/0222; B60L 53/16
See application file for complete search history.

(56) References Cited

U.S. PATENT DOCUMENTS

| | | | | |
|---|---|---|---|---|
| 11,933,252 | B2 * | 3/2024 | Eguchi ................... | F02M 26/70 |
| 2016/0211057 | A1 * | 7/2016 | Peterson ............... | H01B 17/30 |
| 2018/0332726 | A1 * | 11/2018 | Zhu ....................... | H01R 12/716 |
| 2020/0119480 | A1 * | 4/2020 | Mellott ............... | H01R 13/506 |

FOREIGN PATENT DOCUMENTS

| | | |
|---|---|---|
| EP | 3048016 A1 | 7/2016 |
| EP | 3836311 A1 | 6/2021 |

OTHER PUBLICATIONS

International Search Report, International App. No PCT/IB2023/057457 International Filing Date Jul. 21, 2023.

* cited by examiner

*Primary Examiner* — Timothy J Thompson
*Assistant Examiner* — Rhadames Alonzo Miller

(57) ABSTRACT

A wire guide assembly includes a seal cover having a cover opening defined therethrough and a fixation element. A seal is fitted to the seal cover and defines a seal opening aligned with the cover opening in an axial direction of the assembly. A strain relief guide of the assembly is fitted to a side of the seal opposite the seal cover and defines a guide opening aligned with the seal opening and the cover opening in the axial direction.

19 Claims, 5 Drawing Sheets

100

30

120

124

218

210

120

130

CABLE INLET PASS-THROUGH STRAIN RELIEF GUIDE

FIELD OF THE INVENTION

The present disclosure relates to electrical wire or cable handling systems, and more particularly, to a pass-through cable guide and cable seal.

BACKGROUND

In order to achieve reliable operation of electrical systems, it is often desired to seal associated electrical components from harsh operating environments. By way of non-limiting example, electric vehicles (EVs) are increasing in popularity as their practicality and usability improves. Such improvements in performance for both personal and commercial applications require ongoing optimization to extract maximum performance and reliability. One critical aspect of EV performance includes the ability to consistently charge the batteries of an EV as quickly as possible. In this way, it is desired to minimize any degradation in charging performance over the life of the vehicle.

Charging performance can be negatively affected by any number of factors, including water, dirt and other debris contaminating and/or degrading the electrical terminals or contacts of a vehicle's charging inlet or socket housing. Accordingly, it is desired to prevent the ingress of contaminants into the inlet. Further, wire or cable routing in and around these devices is often space constrained. As a result, wiring paths implementing tight bends immediately before and/or after a cable enters an inlet housing may be required.

According to the prior art, pass-through cable guides may be used to guide and seal a cable as it enters into a housing of an electronic device, such as a charging inlet of an EV. However, the presence of tight bends in the cable before and/or after entering the housing often results in stress or strain being applied to the cable. This may cause the cable to pull away from a sealing surface (e.g., glands or sidewalls) of a sealing element of the guide or deflect the guide from a sealing surface of the housing, thereby preventing its ability to provide an effective seal.

Accordingly, there is a need for improved systems and methods for preventing ingress of contaminants into an electrical device housing.

SUMMARY

In one embodiment of the present disclosure, a wire guide assembly includes a seal cover having at least one cover opening defined therethrough and at least one fixation element. A seal is fitted to a face of the seal cover and defines at least one seal opening aligned with the at least one cover opening in an axial direction. A strain relief guide of the assembly is sized to be fitted to a side of the seal opposite the seal cover and defines at least one guide opening aligned with the at least one seal opening and the at least one cover opening in the axial direction.

BRIEF DESCRIPTION OF THE DRAWINGS

The invention will now be described by way of example with reference to the accompanying Figures, of which.

DETAILED DESCRIPTION OF THE EMBODIMENTS

Figure 1:
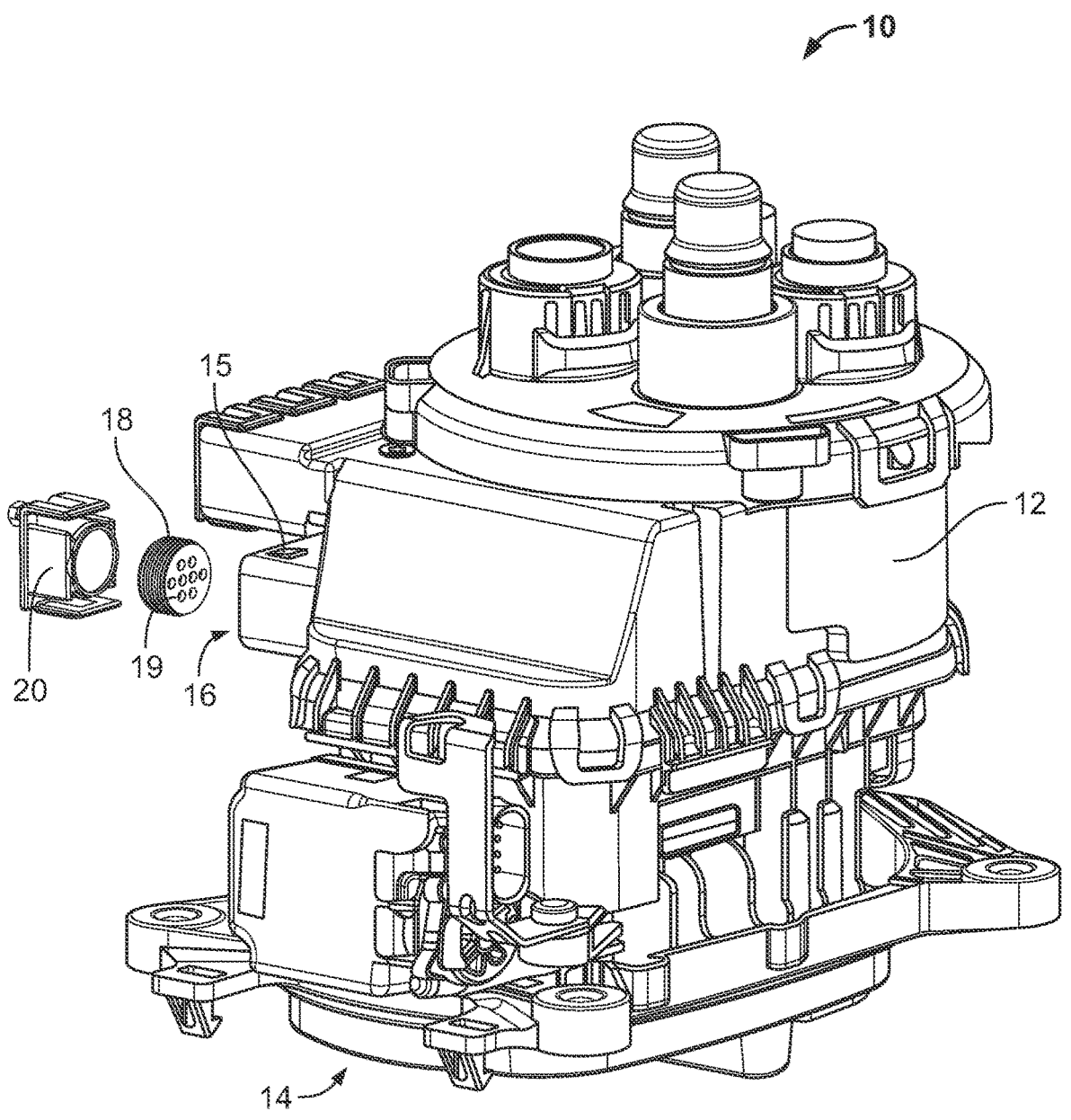
FIG. 1 is a perspective view of a charging inlet assembly useful for describing embodiments of the present disclosure.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Referring generally to FIG. 1, embodiments of the present disclosure will be described in use with an exemplary charging inlet 10, such as that used for charging an electric vehicle. The inlet 10 includes a multi-component body or housing 12 adapted to receive a charging plug in an inlet socket 14 thereof. As understood by one of ordinary skill in the art, the inlet socket 14 includes at least one conductive charging terminal adapted to engage with a corresponding terminal of the charging plug. The inlet 10 further includes at least one opening 16 adapted to receive one or more wires or cables therethrough for electrically connecting conductive components of the inlet to external electrical devices. In the embodiment shown, a seal 18 may be provided between the opening 16 and a removable cover or cap 20. More specifically, the seal 18 may be arranged within the cap 20 for retaining the seal relative to the body 12 of the inlet 10. The seal 18 includes a plurality of apertures 19 defined therethrough for receiving respective wires of a multi-wire cable in a sealing manner. As set forth above, however, inadequate strain relief provided for a cable passing through this seal 16 often prevents the establishment of a reliable seal between the apertures 19 and the wires of the cable, or between an exterior surface of the seal and an internal surface of the opening 16.

Figure 2A:
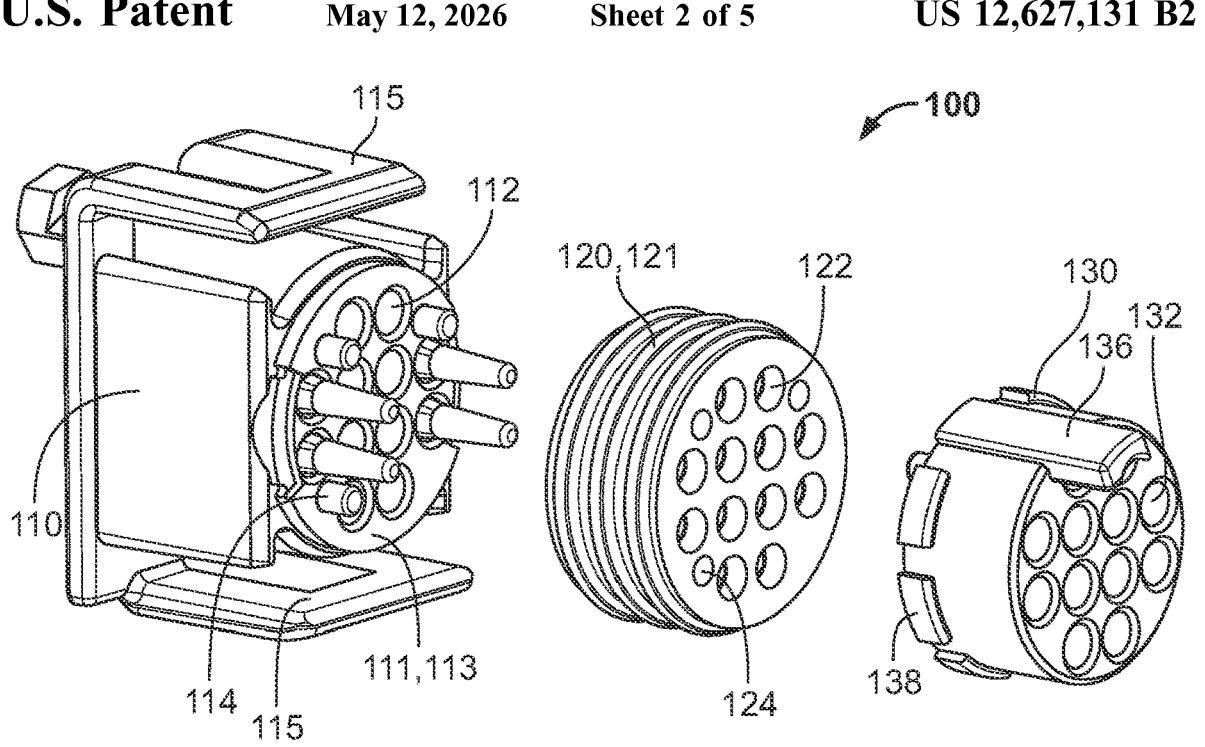
FIG. 2A is an exploded view of a cable strain relief guide according to an embodiment of the present disclosure.
Figure 2B:
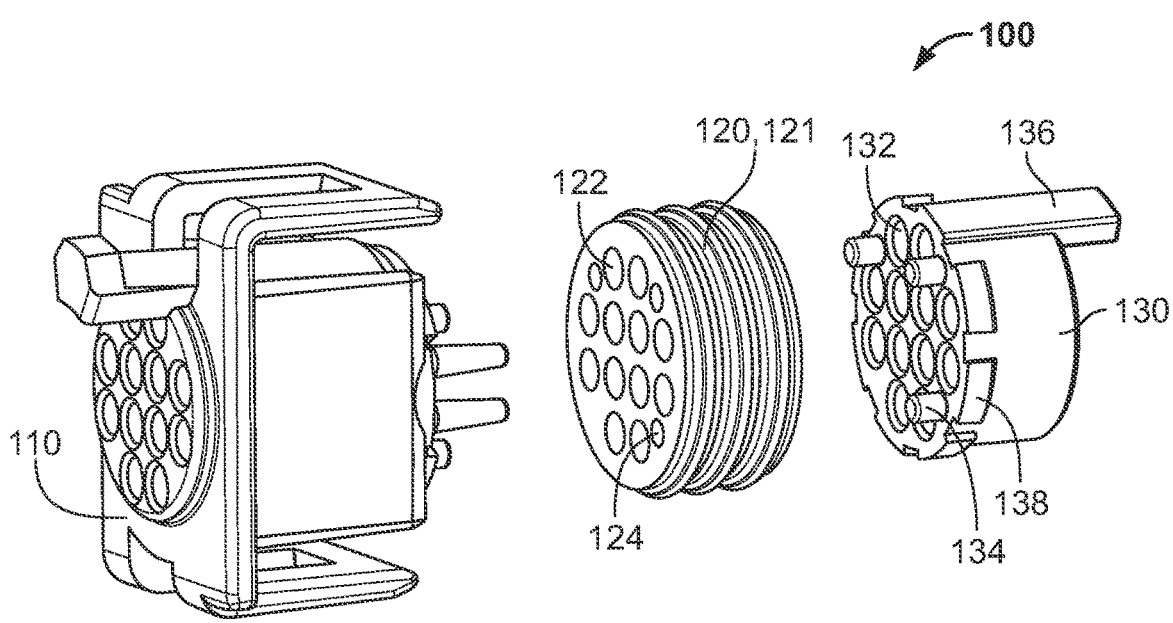
FIG. 2B is another exploded view of the cable strain relief guide of FIG. 2A.
Figure 2C:
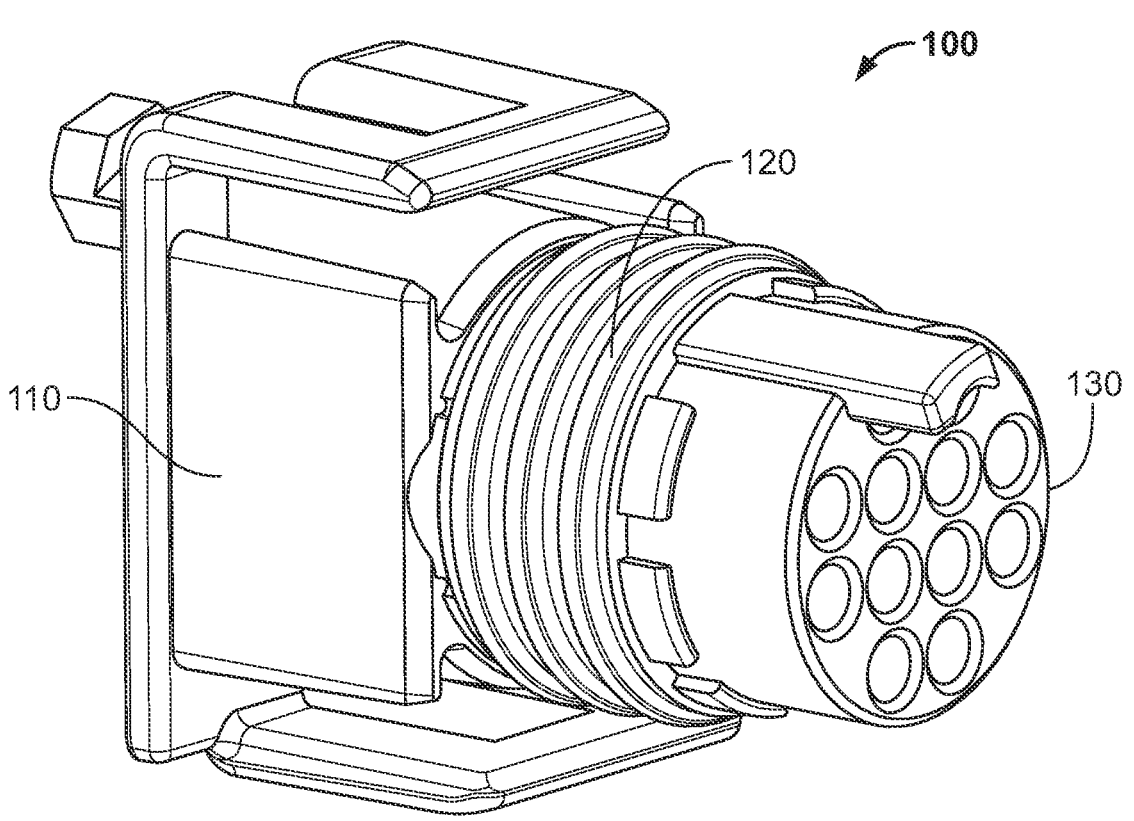
FIG. 2C is a perspective view of the strain relief guide of FIGS. 2A and 2B in an assembled state.

Referring generally to FIGS. 2A-2C, embodiments of the present disclosure include an improved wire guide assembly 100. The assembly 100 comprises a seal cover 110 having a generally cylindrical central body 111 defining at least one cover opening 112. The cover opening(s) 112 extend through the body 111 and are sized to receive a wire or cable therethrough. At least one fixation element 115 is formed integrally with the body 111 for securing the seal cover 110 to a mating component, such as to the body 12 of the charging inlet 10 of FIG. 1. See also FIGS. 3 and 4. In the exemplary embodiment, the fixation element(s) 115 comprise latches sized and positioned to engage with corresponding catches formed on the mating component. Each fixation element 115 extends integrally from a rear end of the body 111, and defines a free end positioned proximate a front end of the body.

The assembly 100 further comprises a seal 120 sized to be fitted to or abut a face 113 of the seal cover 110. The seal 120 may be formed from an elastic, polymer material, and defines at least one seal opening 122 extending therethrough. In the exemplary embodiment, a plurality of seal openings 122 are provided, and aligned with a respective one of the plurality of cover openings 112 in an axial direction of the assembly 100 (i.e., an insertion direction of a cable or wire to be inserted through the assembly). The seal 120 further comprises a ribbed exterior surface, including a plurality of circumferential ribs 121. The ribs 121 are adapted to form a seal between the seal 120 and a corresponding internal surface (e.g., a cylindrical bore) defined in a mating component.

Figure 3:
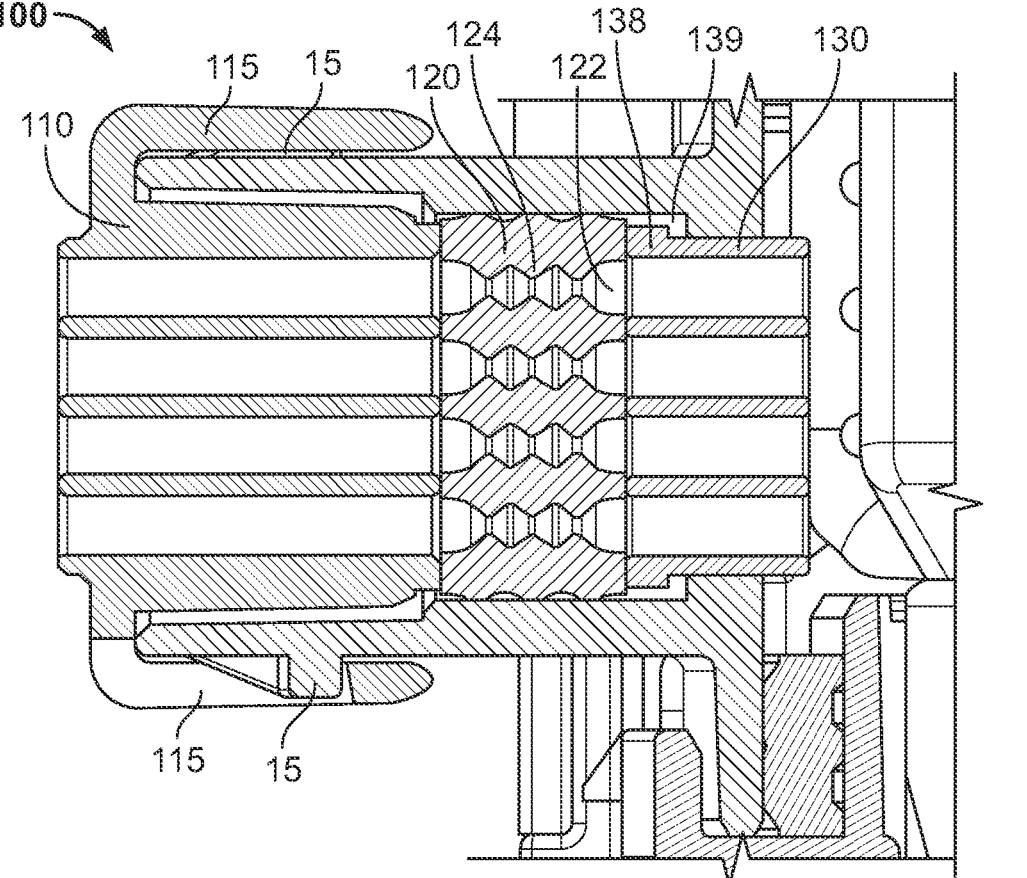
FIG. 3 is a cross-sectional view of the strain relief guide of FIG. 2C in an installed state on a charging inlet.
Figure 4:
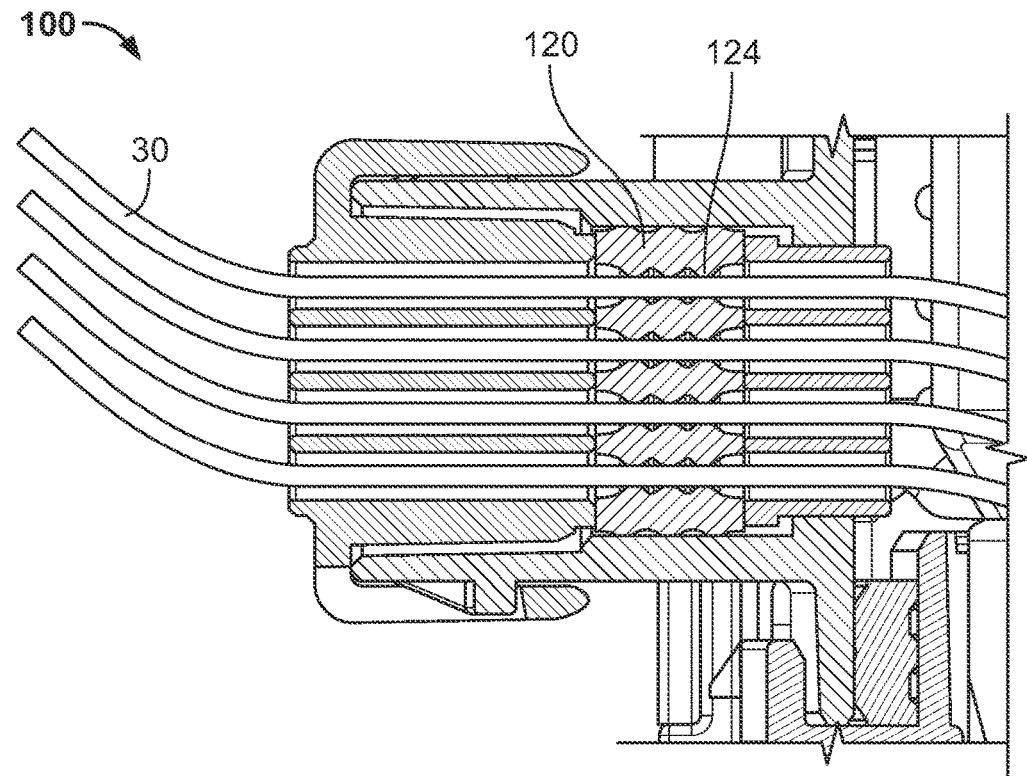
FIG. 4 is a cross-sectional view of the strain relief guide of FIG. 3 with wires or cables installed therethrough.

Still referring to FIGS. 2A-2C, the assembly 100 includes a strain relief guide 130 sized to be fitted to or abut a side of the seal 120 opposite the seal cover 110. The strain relief guide 130 comprises a generally cylindrical body 131 defining at least one, or in the illustrated embodiment, a plurality of guide opening 132 aligned with the plurality of seal openings 122 and cover openings 112 in the axial direction. The strain relief guide 130 may further comprise an alignment feature or protrusion 136 extending from an end thereof opposite the seal 120. The alignment feature 136 is operative to engage with a complementary recess defined in the mating component (e.g., the body 12 of the charging inlet 10) for fixing the orientation of the assembly 100 relative thereto in its installed state. A flange 138 may be formed circumferentially about the strain relief guide 130 for limiting an insertion depth of the assembly 100 into the mating component, as shown in FIGS. 3 and 4. The flange 138 may be keyed, or formed discontinuously about its circumference. In this way, the flange 138 may more securely engage with a secondary seal 139 arranged within the opening or bore of the inlet body 12.

As shown in FIGS. 2A and 2B, the seal cover 110 further comprises a plurality of retainment or alignment protrusions 114 extending from the first face 113 thereof in the axial direction. In the exemplary embodiment, the retaining protrusions 114 are uniformly cylindrical in shape. Likewise, the seal 120 defines a plurality of correspondingly shaped retaining openings 124 aligned with the plurality of retaining protrusions 114. In the assembled state shown in FIG. 2C, the retaining protrusions 114 are received within the retaining openings 124, fixing the position of the seal 120 relative to the cover 110 and preventing its rotation during use. Likewise, as shown in FIG. 2B, the strain relief guide 130 may include a plurality of retaining or alignment protrusions 134 received within corresponding ones of the retaining openings 124 of the seal 120. In some embodiments, the same retaining opening 124 may receive retaining protrusions 114,134 of both the seal cover 110 and the strain relief guide 130.

Referring again to FIGS. 3 and 4, the assembly 100 is shown in the installed position and fixed to the inlet body 12, or an exemplary mating component housing. As shown, two fixation elements or latches 115 of the seal cover 110 receive corresponding catches 15 of the body 12. With the assembly fixed to the inlet body 12, the seal cover 110 and seal 120 apply a seating pressure on the strain relief guide 130 in the axial direction. A corresponding axial compression of the seal 120 may result in its radial expansion, urging the sealing ribs 121 thereof into an internal sealing surface of the opening 16 of the inlet body 12.

As shown in FIGS. 3 and 4, the seal openings 122 each comprise a varying diameter moving in the axial direction. More specifically, each seal opening 122 may comprise a plurality of internal sealing ribs 124, with each rib sized to sealingly engage with an outer insulation of a wire 30 passing therethrough. In one embodiment, at least three sealing ribs 124 are formed within each seal opening 122. The diameter of the seal opening 122 widens one each side of each sealing rib 124. The diameters of each seal opening 122 at respective ends of the seal 120 correspond to a diameters of each of the openings 112,134 of the cover 110 and the strain relief guide 130, at least in the areas where the cover and strain relief guide abut the seal in the assembled state. In this way, the wire 30 is permitted to more freely pass therethrough. Moreover, the seal cover 110 and guide 130 and their respective openings 112,132 provide strain relief to either side of a cable or wire inserted through the assembly 100, as shown in FIG. 4. In this way, excess strain on the wires 30 as well as the seal 120 is prevented. By reducing strain or tension on the seal 120, deformation thereof is reduced, and a water-tight seal can be more reliably ensured.

Figure 5:
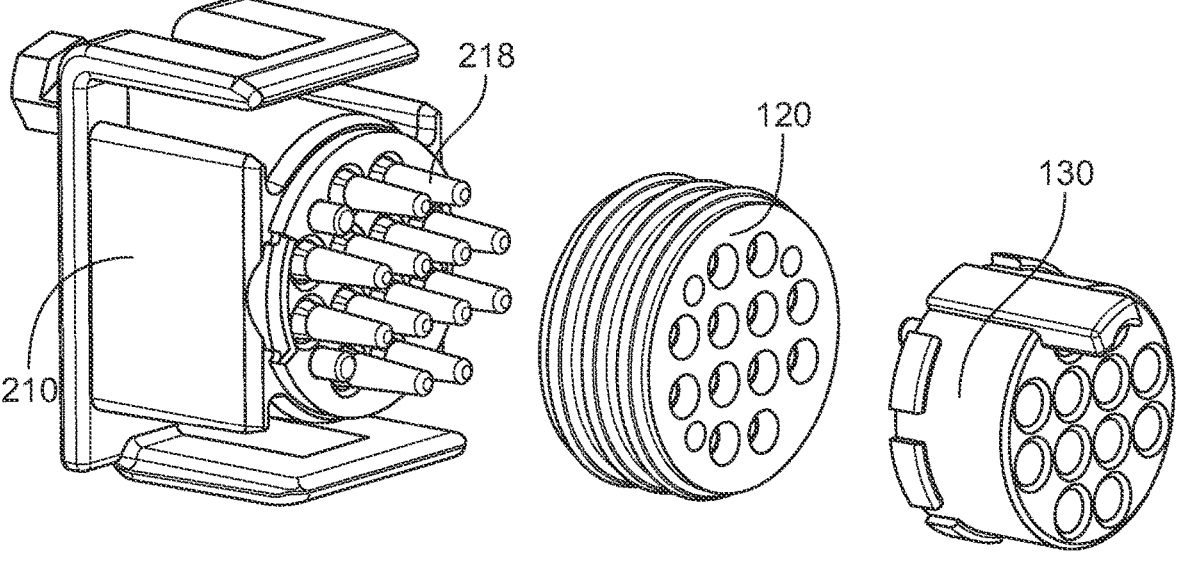
FIG. 5 is an exploded view of a strain relief guide according to another embodiment of the present disclosure.
Figure 6:
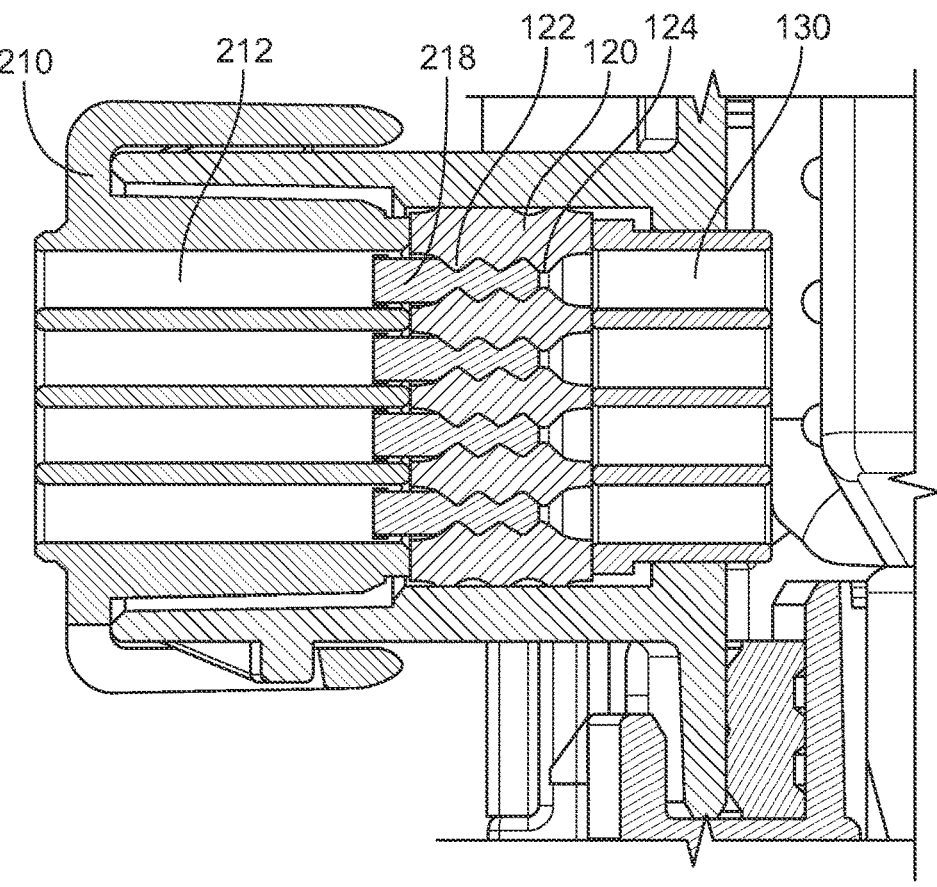
FIG. 6 is a cross-sectional view of the strain relief guide of FIG. 5 in an installed state on a charging inlet.

Referring now to FIGS. 5 and 6, according to another embodiment of the present disclosure, a seal cover 210 comprises a plurality of hollow posts 218 extending from each of a plurality of cover openings 212 in a direction of the seal 120. As shown in FIG. 6, in an assembled state, the posts 218 extend partially through respective seal openings 122 of the seal 120. Preferably, at least one sealing rib 124 of the seal 120 remains exposed by the cover 210 in the assembled state, In this way, a wire inserted through the post 218 may still sealing engage directly with the seal 120. The remaining sealing ribs 124 of each seal opening 122 engage with an external surface of each post 218. The embodiment of FIGS. 5 and 6 may be advantageous in that insertion of a cable or wire (e.g., a wire 30 as shown in FIG. 4) through each of the openings 122 of the seal 120 is made easier by the presence of the posts 218. Likewise, the posts 218 provide additional strain relief for each of the wires inserted therethrough, limiting any deflection of the seal 120 and further improving the sealing characteristics of the resulting assembly.

Figure 7:
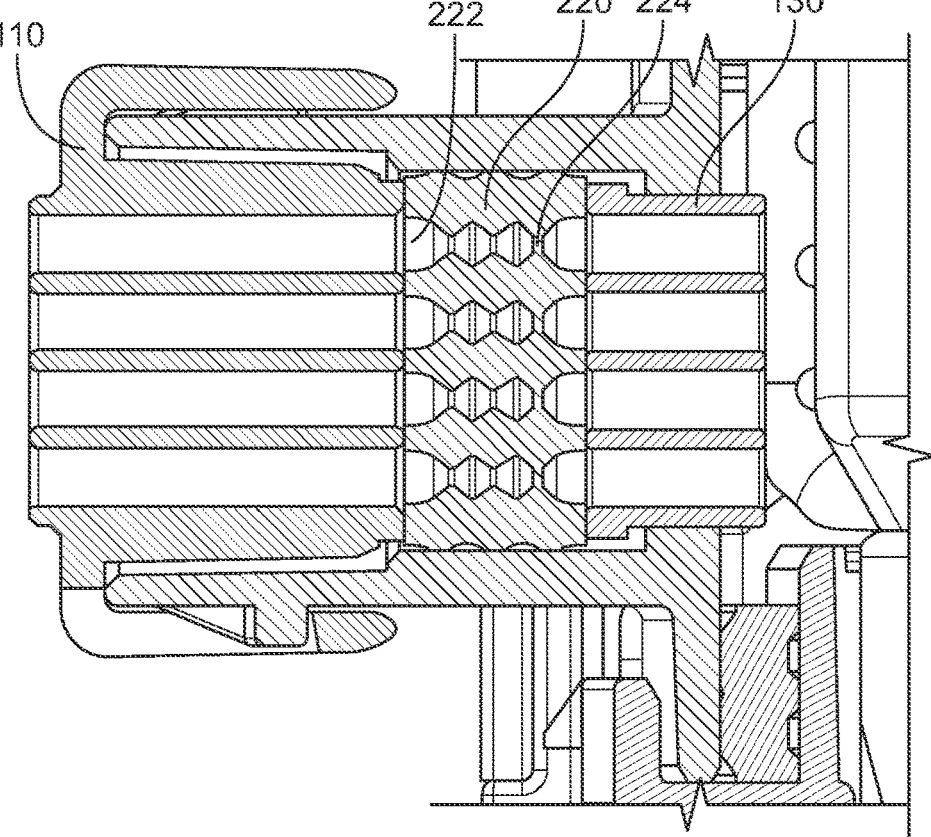
FIG. 7 is a cross-sectional view of a strain relief guide according to another embodiment of the present disclosure.

Referring now to FIG. 7, a seal 220 according to another embodiment of the present disclosure includes internal flashing 224 temporarily blocking each seal opening 222. More specifically, each seal opening 222 may initially be discontinuous in the axial direction, or the insertion direction of a wire or cable, with the flashing 224 blocking a respective seal opening 222. Either via a force applied on the flashing 224 by a cable or wire, or via the insertion of a cover having the protruding posts 218 of the embodiment of FIGS. 5 and 6, the flashing 224 may be broken, and the wire or cable permitted to pass through the opening(s) 222 in a sealed manner. The flashing 224 may be formed by a molding process in conjunction with the formation of a remainder of the seal 220.

It should be understood that the embodiments of FIGS. 5-7 share numerous additional features similar to those described with respect to the embodiments of FIGS. 2A-4, unless otherwise indicated. However, a detailed description of these features has been omitted herein in the interest of brevity.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

What is claimed is:

1. A wire guide assembly, comprising:
a monolithic seal cover, including:
at least one cover wire opening defined therethrough and sized to receive at least one wire; and
a plurality of retaining protrusions extending in the axial direction;
a strain relief guide defining at least one guide wire opening aligned with the at least one cover opening in an axial direction of the assembly and sized to receive the at least one wire; and
a seal arranged between and separating the seal cover and the strain relief guide and defining at least one seal wire opening therethrough and a plurality of retaining openings, the at least one seal wire opening aligned with the at least one cover opening and at least one guide opening in the axial direction and sized to form a seal with the at least one wire inserted therethrough, the plurality of retaining openings receiving the retaining protrusions and fixing the seal to the seal cover, the seal cover defines a first face, the retaining protrusions extending from the first face in the axial direction and toward the strain relief guide, a first axially facing side of the seal opposingly abuts the first face of the seal cover and a second axially facing side of the seal opposite the first axially facing side of the seal opposingly abuts the strain relief guide.

2. The wire guide assembly of claim 1, wherein the strain relief guide includes a plurality of retaining protrusions received within the plurality of retaining openings of the seal and fixing the strain relief guide to the seal.

3. The wire guide assembly of claim 1, wherein the strain relief guide includes an alignment protrusion extending from an end thereof opposite the seal.

4. The wire guide assembly of claim 1, wherein the at least one seal wire opening comprises a diameter varying along the axial direction.

5. The wire guide assembly of claim 4, wherein the at least one seal wire opening defines a plurality of internal sealing ribs, each rib sized to form a seal with an outer insulation of a wire passing therethrough.

6. The wire guide assembly of claim 5, wherein the seal cover includes at least one guide post coaxially aligned with the at least one cover wire opening and extending into the at least one seal wire opening.

7. The wire guide assembly of claim 6, wherein the at least one guide post engages with a portion of the plurality of internal sealing ribs of a corresponding seal wire opening, the at least one guide post adapted to receive the at least one wire therethrough.

8. The wire guide assembly of claim 1, wherein the seal comprises a ribbed circumferential exterior sealing surface.

9. The wire guide assembly of claim 1, wherein the at least one seal wire opening is closed in the axial direction via flashing.

10. The wire guide assembly of claim 1, wherein the seal cover includes a latch adapted to engage with a corresponding catch of an electronics device housing.

11. An electrical assembly, comprising:
an electrical device having a body defining a wire opening;
a wire guide assembly at least partially insertable into the wire opening of the electrical device and including:
a cover selectively fixable to the body over the wire opening, and defining a wire opening sized to receive a wire;
a guide arranged in the wire opening of the electrical device and having a wire opening a sized to receive the wire; and
a seal arranged in the wire opening of the electrical device and positioned between and completely separating the cover and the guide, and defining a wire opening sized to receive the wire, the cover defines a first face, a first axially facing side of the seal opposingly abuts the first face of the cover and a second axially facing side of the seal opposite the first axially facing side of the seal opposingly abuts the guide.

12. The electrical assembly of claim 11, wherein the cover and the guide are fixedly attached to the seal.

13. The electrical assembly of claim 11, wherein the wire opening of the seal defines a plurality of internal sealing ribs each sized to form a seal with an outer insulation of the wire passing therethrough.

14. The electrical assembly of claim 11, wherein the seal cover includes a hollow guide post coaxially aligned with the wire opening of the cover and extending into the wire opening of the seal.

15. A charging inlet for an electric vehicle, comprising:
a body for housing at least one conductive terminal, the body including at least one inlet opening;
a wire inserted through the inlet opening of the body; and
a wire guide assembly receiving the wire and inserted through the inlet opening of the body, including:
a seal cover removably attached to the at least one inlet opening and including a cover wire opening defined therethrough and receiving the wire;
a strain relief guide defining a guide wire opening aligned with the cover opening and receiving the wire; and
a seal arranged between and completely separating the seal cover and the strain relief guide and defining at a seal wire opening aligned with the cover opening and the guide opening in the axial direction, the seal opening receiving the wire and forming a seal therewith, the seal cover defines a first face, a first axially facing side of the seal opposingly abuts the first face of the seal cover and a second axially facing side of the seal opposite the first axially facing side of the seal opposingly abuts the strain relief guide.

16. The charging inlet of claim 15, wherein the seal wire opening defines a plurality of internal sealing ribs, each rib sized to form a seal with an outer insulation of the wire passing therethrough.

17. The charging inlet of claim 15, wherein the strain relief guide includes an alignment protrusion extending from an end thereof opposite the seal and engaging with the body for fixing the axial position of the wire guide assembly.

18. The charging inlet of claim 15, wherein the cover defines a hollow post extending from the cover opening in a direction of the seal, the post extending partially through the seal with the seal fitted to the cover.

19. A wire guide assembly, comprising:

a monolithic seal cover, including:

at least one cover wire opening defined therethrough and sized to receive at least one wire; and at least one guide post coaxially aligned with the at least one cover wire opening and adapted to receive the at least one wire;

a strain relief guide defining at least one guide wire opening aligned with the at least one cover opening in an axial direction of the assembly and sized to receive the at least one wire; and a seal arranged between and separating the seal cover and the strain relief guide and defining at least one seal wire opening therethrough, the at least one seal wire opening aligned with the at least one cover opening and at least one guide opening in the axial direction and sized to form a seal with the at least one wire inserted therethrough, the at least one guide post extending into and engaging with the at least one seal wire opening, the seal cover defines a first face, the at least one guide post extending from the first face in the axial direction and toward the strain relief guide, a first axially facing side of the seal opposingly abuts the first face of the seal cover and a second axially facing side of the seal opposite the first axially facing side of the seal opposingly abuts the strain relief guide.

* * * * *